US012800477B2

(12) United States Patent
Watanabe

(10) Patent No.: US 12,800,477 B2
(45) Date of Patent: Nov. 17, 2026

(54) MEASURING DEVICE, AND SAMPLE LIQUID FEEDING METHOD

(71) Applicant: ARKRAY, Inc., Kyoto (JP)

(72) Inventor: Yukio Watanabe, Kyoto (JP)

(73) Assignee: ARKRAY, Inc., Kyoto (JP)

( * ) Notice: Subject to any disclaimer, the term of this patent is extended or adjusted under 35 U.S.C. 154(b) by 233 days.

(21) Appl. No.: 18/348,016

(22) Filed: Jul. 6, 2023

(65) Prior Publication Data

US 2024/0019357 A1 Jan. 18, 2024

(30) Foreign Application Priority Data

Jul. 15, 2022 (JP) ................................ 2022-114271
Jan. 23, 2023 (JP) ................................ 2023-008402

(51) Int. Cl.
*G01N 15/1404* (2024.01)
*G01N 21/05* (2006.01)

(52) U.S. Cl.
CPC ......... *G01N 21/05* (2013.01); *G01N 15/1404* (2013.01); *G01N 2021/058* (2013.01)

(58) Field of Classification Search
CPC ............. G01N 21/05; G01N 2021/058; G01N 15/1409; G01N 15/1404; G01N 15/1433; G01N 2015/1497; G01N 15/1459; G01N 2015/1006
See application file for complete search history.

(56) References Cited

U.S. PATENT DOCUMENTS 6,159,739 A 12/2000 Weigl et al.
10,852,223 B2 * 12/2020 Masuda ............ G01N 15/1404
(Continued)

FOREIGN PATENT DOCUMENTS

JP 2001-519038 A 10/2001
JP 2020-129012 A 8/2020

OTHER PUBLICATIONS

Communication pursuant to Article 94(3) EPC issued by the European Patent Office on May 21, 2025, which Corresponds to European Patent Application No. 23 185 242.7-1001 and is related to U.S. Appl. No. 18/348,016.
(Continued)

*Primary Examiner* — Rebecca C Bryant
(74) *Attorney, Agent, or Firm* — Studebaker Brackett PLLC

(57) ABSTRACT

There is provided a method of feeding a sample liquid to a flow cell having a merging path in which a sample liquid and a sheath liquid flow, at least one sheath liquid flow path that introduces the sheath liquid into the merging path along a flowing direction of fluid in the merging path, and a sample flow path introducing the sample liquid into the merging path at an angle orthogonal to the flowing direction, wherein, given that an opening surface area of a sheath liquid introducing opening of the sheath liquid flow path onto the merging path is S1, an opening surface area of a sample liquid introducing opening of the sample flow path onto the merging path is S2, a flow rate per unit time of the sheath liquid supplied to the sheath liquid flow path is L, and a flow rate per unit time of the sample liquid supplied to the sample flow path is J, a relationship (L/S1)/(J/S2)≥0.7 is satisfied.

9 Claims, 12 Drawing Sheets

(56) References Cited

U.S. PATENT DOCUMENTS

| | | | | |
|---|---|---|---|---|
| 2005/0123450 | A1* | 6/2005 | Gilbert | B07C 5/00 422/81 |
| 2008/0166188 | A1 | 7/2008 | Gilbert et al. | |
| 2017/0059459 | A1 | 3/2017 | McPeak et al. | |
| 2018/0372612 | A1 | 12/2018 | Masuda | |

OTHER PUBLICATIONS

The extended European search report issued by the European Patent Office on Dec. 11, 2023, which corresponds to European Patent Application No. 231852427-1001 and is related to U.S. Appl. No. 18/348,016.
"Notice of Reasons for Refusal" Office Action issued in JP 2023-008402; mailed by the Japanese Patent Office on Jun. 16, 2026.

* cited by examiner

FIG.9

| | | WIDTH D [mm] | | | |
|---|---|---|---|---|---|
| | | 0.3 | 0.5 | 0.7 | 1 |
| (L／(A x B)) / (J／(C x D)) | 1.4583 | ○ | ○ | ○ | ○ |
| | 1.1667 | ○ | ○ | ○ | ○ |
| | 0.9722 | ○ | ○ | ○ | ○ |
| | 0.8333 | ○ | ○ | ○ | ○ |
| | 0.7292 | ○ | ○ | ○ | ○ |
| | 0.6481 | × | × | × | × |
| | 0.5833 | × | × | × | × |
| | 0.4861 | × | × | × | × |

FIG.10

| | | WIDTH D [mm] | | | |
|---|---|---|---|---|---|
| | | 0.3 | 0.5 | 0.7 | 1 |
| (L／(A x B)) / (J／(C x D)) | 1.4583 | ○ | ○ | ○ | ○ |
| | 1.1667 | ○ | ○ | ○ | ○ |
| | 0.9722 | ○ | ○ | ○ | ○ |
| | 0.8333 | ○ | ○ | ○ | ○ |
| | 0.7292 | ○ | ○ | ○ | ○ |
| | 0.6481 | × | × | ○ | ○ |
| | 0.5833 | × | × | × | × |
| | 0.4861 | × | × | × | × |

MEASURING DEVICE, AND SAMPLE LIQUID FEEDING METHOD

CROSS-REFERENCE TO RELATED APPLICATION

This application is based on and claims priority under 35 USC 119 from Japanese Patent Applications Nos. 2022-114271 filed on Jul. 15, 2022 and 2023-008402 filed on Jan. 23, 2023, the disclosures of which are incorporated by reference herein.

BACKGROUND

Technical Field

The present disclosure relates to a measuring device and a sample liquid feeding method that cause a sheath liquid to flow together with a sample liquid, and analyze particles in the sample.

Related Art

A cell detecting device is disclosed in Japanese Patent Application Laid-Open (JP-A) No. 2020-129012.

JP-A No. 2020-129012 discloses a structure in which a sample liquid is supplied to a flow path for measurement from a flow path entrance of a flow cell by using a jetting nozzle, and a sheath liquid also is supplied to the flow path for measurement from the same flow path entrance. The sample liquid that is fed-out from the jetting nozzle to the flow path flows downstream in a state of being sheathed by the sheath liquid, and passes the detection position. Particles of the prepared sample are detected from an image that is obtained by imaging the particles of the sample that passes the detection position.

In the structure disclosed in JP-A No. 2020-129012, because the sample liquid passes by the detection position in a state of being sheathed in the sheath liquid, it is difficult to obtain a clear captured image. Further, there is no concrete disclosure relating to the sample supplying structure that uses the sheath liquid and the jetting nozzle.

SUMMARY

In view of the above-described circumstances, an object of the present disclosure is to provide a measuring device and a sample liquid feeding method that acquire a clear image of a sample by a simple structure, while suppressing the mixing-together of a sample liquid with a sheath liquid.

A measuring device of the present disclosure includes: a flow cell having a merging path in which a sample liquid and a sheath liquid flow, at least one sheath liquid flow path that introduces the sheath liquid into the merging path along a flowing direction of fluid in the merging path, and a sample flow path introducing the sample liquid into the merging path at an angle orthogonal to the flowing direction; an imaging section that images the sample liquid flowing through the merging path; a sheath liquid supplying section that supplies the sheath liquid to the sheath liquid flow path; a sample liquid supplying section that supplies the sample liquid to the sample flow path; and a control section controlling the sample liquid supplying section and the sheath liquid supplying section such that, given that an opening surface area of a sheath liquid introducing opening of the sheath liquid flow path onto the merging path is S1, an opening surface area of a sample liquid introducing opening of the sample flow path onto the merging path is S2, a flow rate per unit time of the sheath liquid supplied to the sheath liquid flow path is L, and a flow rate per unit time of the sample liquid supplied to the sample flow path is J, the following a relationship is satisfied:

$$(L/S1)/(J/S2)\geq 0.7.$$

In the measuring device of the present disclosure, at least one of the sheath liquid introducing opening or the sample liquid introducing opening may be rectangular.

In the measuring device of the present disclosure, it is preferable that a width of the sample liquid introducing opening, orthogonal to the flowing direction in the merging path, is within a range of 0.3 mm to 1.0 mm.

In the measuring device of the present disclosure, it is preferable that a depth of the sheath liquid introducing opening, along a direction of introducing the sample liquid, is within a range of 0.4 mm to 0.8 mm.

In the measuring device of the present disclosure, the merging path may have: a merging portion at which the sample flow path and the sheath liquid flow path merge; a flat portion disposed further toward a downstream side than the merging portion, and formed so as to be flush with one wall surface among facing wall surfaces of the merging portion, and at which a distance between the facing wall surfaces is shorter than at the merging portion; and a tapered portion connecting the merging portion and the flat portion, and at which the distance between the facing wall surfaces gradually decreases toward a downstream side.

In the measuring device of the present disclosure, the sample liquid introducing opening may be formed in the one wall surface.

In the measuring device of the present disclosure, the one wall surface and one wall surface of the sheath liquid flow path may be flush.

It is preferable that the imaging section is disposed at aside of the merging path, at which side the sample liquid is introduced in, with the flow cell therebetween.

A sample liquid feeding method of the present disclosure is a method of feeding a sample liquid to a flow cell having a merging path in which a sample liquid and a sheath liquid flow, at least one sheath liquid flow path that introduces the sheath liquid into the merging path along a flowing direction of fluid in the merging path, and a sample flow path introducing the sample liquid into the merging path at an angle orthogonal to the flowing direction, wherein, given that an opening surface area of a sheath liquid introducing opening of the sheath liquid flow path onto the merging path is S1, an opening surface area of a sample liquid introducing opening of the sample flow path onto the merging path is S2, a flow rate per unit time of the sheath liquid supplied to the sheath liquid flow path is L, and a flow rate per unit time of the sample liquid supplied to the sample flow path is J, the following relationship is satisfied: $(L/S1)/(J/S2)\geq 0.7$.

In accordance with the measuring device and liquid feeding method of a sample of the present disclosure, a clear image of a sample can be acquired by a simple structure, while suppressing the mixing-together of a sample liquid with a sheath liquid.

BRIEF DESCRIPTION OF THE DRAWINGS

Exemplary embodiments of the present disclosure will be described in detail based on the following figures, wherein:

FIG. 9 is a table illustrating results of Evaluation 1 of simulations in which the sample liquid and the sheath liquid are made to flow to the flow cell of the first embodiment, and the flow of the sample liquid is evaluated;

FIG. 10 is a table illustrating results of Evaluation 2 of simulations in which the sample liquid and the sheath liquid are made to flow to the flow cell of the first embodiment, and the flow of the sample liquid is evaluated.

DETAILED DESCRIPTION

Figure 1:
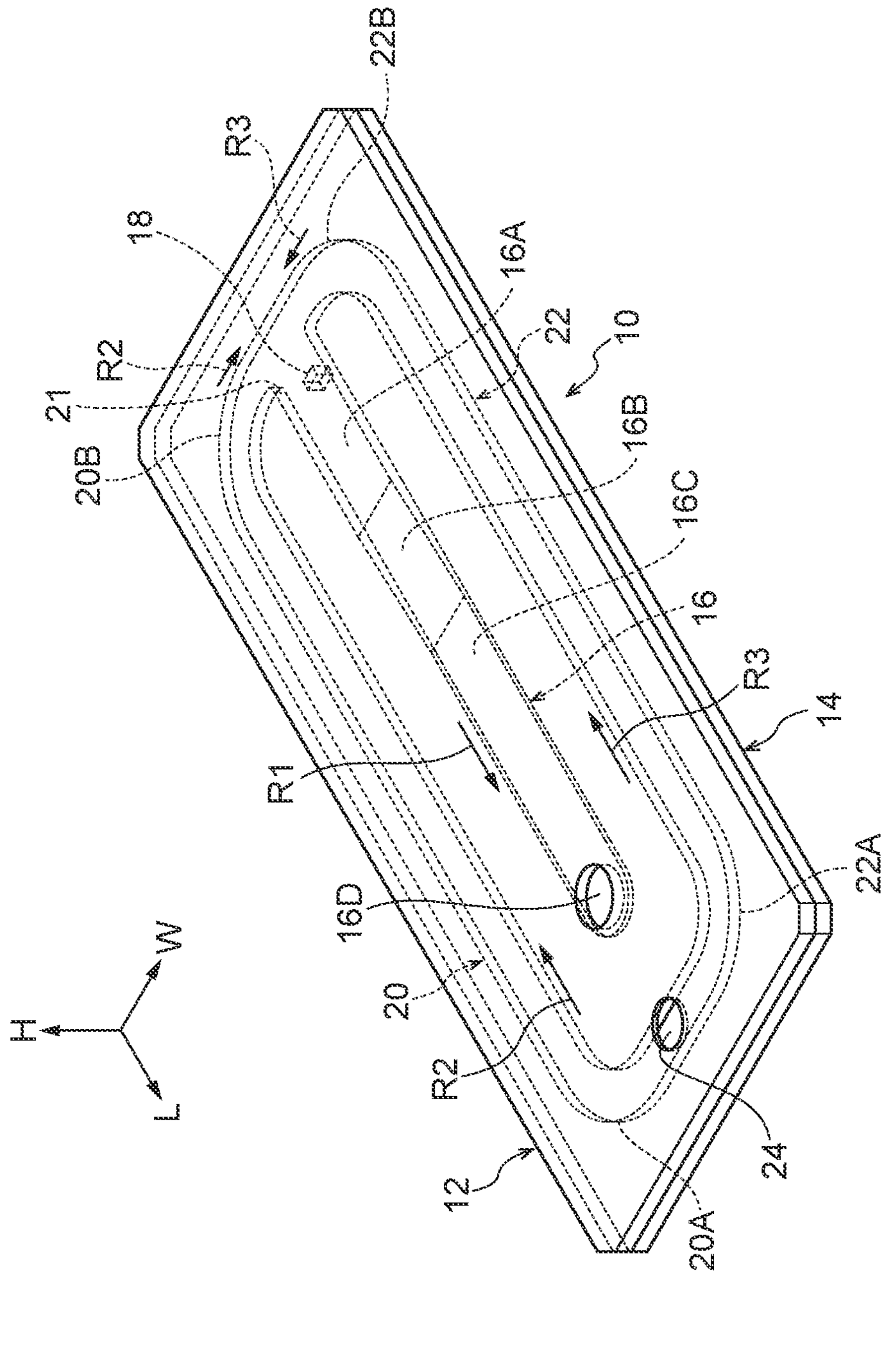
FIG. 1 is a perspective view illustrating a flow cell relating to a first embodiment.

An embodiment of the present disclosure is described on the basis of the drawings. Note that arrow H that is shown appropriately in the drawings indicates the height direction (thickness direction) of a flow cell, and arrow W indicates the width direction of the flow cell. Further, in the drawings, arrow L indicates the length direction of the flow cell that is orthogonal to the height direction and the width direction, respectively. (Arrow L indicates the downstream side in the flowing direction of the flow path after a sheath liquid and a sample liquid have merged.) Further, arrow UP that is shown appropriately in the drawings indicates the upper side in the up-down direction of a measuring device. In the present specification, when there are numerical ranges expressed by using "~", the numerical range means a range that includes, as the lower limit value and the upper limit value thereof, the numerical values listed before and after the "~".

First Embodiment

A measuring device and sample liquid feeding method of a first embodiment relating to a present disclosure are described hereinafter by using the drawings.

(Structure of Flow Cell)

A flow cell 10 of a measuring device 70 (see FIG. 7) of the present embodiment is illustrated in a perspective view in FIG. 1. The flow cell 10 is illustrated in a plan view in FIG. 2. Further, the flow cell 10 is illustrated in an exploded perspective view in FIG. 3. Note that, in FIG. 3, in order to make it easy to understand the structure of the flow cell 10, the flow cell 10 is illustrated in a state in which the height direction thereof (the H direction), i.e., the up-down direction, is opposite to that in FIG. 1 and FIG. 2.

The flow cell 10 of the present embodiment is used in the examining of material components contained in urine in which, for example, by introducing a urine sample, which serves as an example of a sample liquid, together with a sheath liquid, an image of material components in the urine sample is captured by an imaging means of the measuring device 70, and analysis is carried out from the shapes and the like of the material components in the captured image. In the present embodiment, as an example, the examination of material components within urine is carried out by using a urine sample, but the technique of the present disclosure can also be applied to samples and applications such as blood, cells, bodily fluids, and the like.

Figure 2:
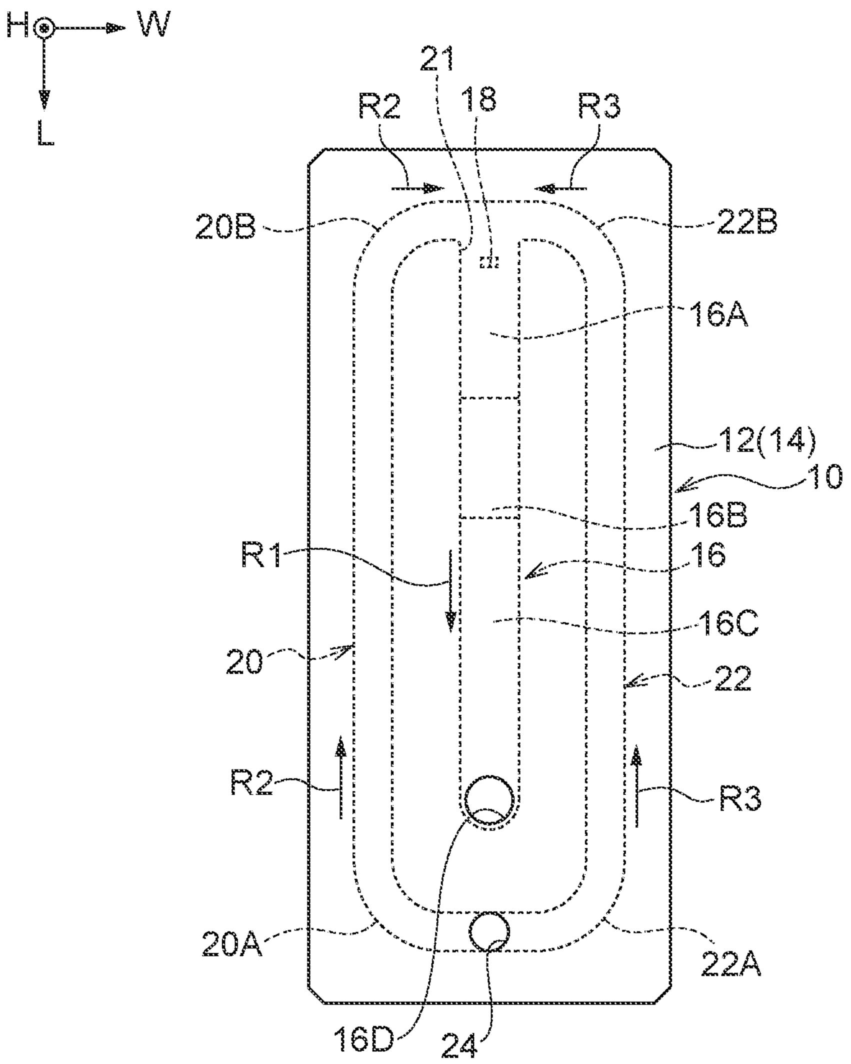
FIG. 2 is a plan view illustrating the flow cell relating to the first embodiment.
Figure 3:
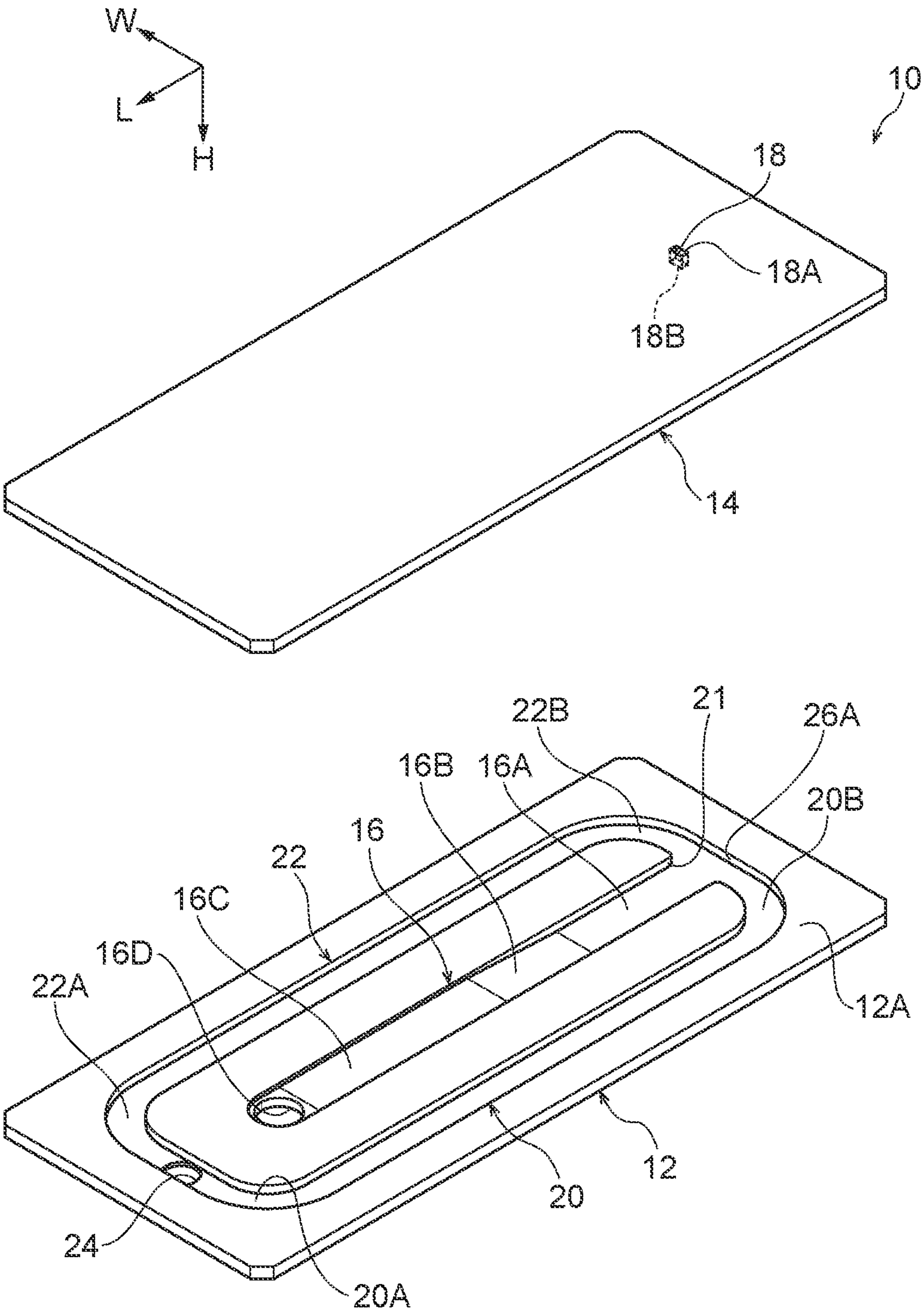
FIG. 3 is an exploded perspective view illustrating the flow cell relating to the first embodiment.

As illustrated in FIGS. 1 through 3, the flow cell 10 is a flat-plate-shaped member that is substantially rectangular. In the present embodiment, the flow cell 10 is structured by a first plate-shaped body 12 that is flat-plate-shaped and a second plate-shaped body 14 that is flat-plate-shaped being laminated together in a state of planarly contacting one another. The first plate-shaped body 12 and the second plate-shaped body 14 are substantially the same shape as seen in plan view. The flow cell 10 has a merging path 16 in which a sample liquid 2 and a sheath liquid 4 (see FIG. 6) flow, and a sample flow path 18 in which the sample liquid flows at the upstream side of the merging path 16. Further, the flow cell 10 has a sheath liquid flow path 21 at which the merging path 16 is extended at the upstream side in the flowing direction of the merging path 16 (the arrow R1 direction) and in which the sheath liquid flows. Moreover, the flow cell 10 has a first sheath liquid flow path 20 that is connected to the upstream side of the sheath liquid flow path 21 and in which the sheath liquid flows, and a second sheath liquid flow path 22 that is connected to the sheath liquid flow path 21 and is disposed at the side opposite the first sheath liquid flow path 20 and in which the sheath liquid flows.

The merging path 16, the sheath liquid flow path 21, the first sheath liquid flow path 20 and the second sheath liquid flow path 22 are formed in the first plate-shaped body 12 (see FIG. 3). Note that, in FIG. 3, as described above, the flow cell 10 is illustrated in a state in which the up-down direction thereof is opposite that illustrated in FIG. 1 and FIG. 2, and therefore, the positional relationship of the first sheath liquid flow path 20 and the second sheath liquid flow path 22 is opposite that of FIG. 1 and FIG. 2. In the present embodiment, the merging path 16, the sheath liquid flow path 21, the first sheath liquid flow path 20 and the second sheath liquid flow path 22 are formed by carrying out groove machining at a surface 12A at one side of the first plate-shaped body 12 (see FIG. 3). The second plate-shaped body 14 is a plate member having flat surfaces that are substantially flush at the upper and lower sides thereof respectively, and the sample flow path 18 is formed therein (see FIG. 3).

The first sheath liquid flow path 20 is a path that, as seen in plan view, is substantially U-shaped, is long transversely, and is disposed along the outer periphery of the flow cell 10. The opening side of the substantial U-shape faces in the width direction of the flow cell 10 (the W direction). The first sheath liquid flow path 20 is formed at a region that is at one side in the width direction of the flow cell 10 (the W direction). In the present embodiment, the cross-sectional shape of the first sheath liquid flow path 20 in the direction orthogonal to the extending direction thereof is substantially rectangular.

The first sheath liquid flow path 20 is structured such that the sheath liquid 4 flows in the arrow R2 direction. A sheath take-in opening 24, which passes-through the first plate-shaped body 12 in the height direction H, is formed in the end portion, which is at the upstream side in the flowing direction (the arrow R2 direction), of the first sheath liquid flow path 20. The sheath liquid 4 is supplied from the sheath take-in opening 24, and this sheath liquid 4 flows toward the upstream side of the merging path 16. Two bent portions 20A, 20B are formed along the way of the flowing direction at the first sheath liquid flow path 20. The bent portions 20A, 20B are bent substantially 90°, and the corner portions of the portions that are bent are formed so as to be curved in rounded shapes.

The second sheath liquid flow path 22 is a path that, as seen in plan view, is substantially U-shaped, is long transversely, and is disposed along the outer periphery of the flow cell 10. The opening side of the substantial U-shape faces the opening side of the substantial U-shape of the first sheath liquid flow path 20 in the width direction of the flow cell 10 (the W direction). The second sheath liquid flow path 22 is formed at the region that is at the another side in the width direction of the flow cell 10 (the W direction) (i.e., the side opposite the first sheath liquid flow path 20). In the present embodiment, the cross-sectional shape of the second sheath liquid flow path 22 in the direction orthogonal to the extending direction thereof is substantially rectangular. The first sheath liquid flow path 20 and the second sheath liquid flow path 22 are disposed at substantially the same height in the height direction H of the flow cell 10. The second sheath liquid flow path 22 and the first sheath liquid flow path 20 are formed so as to be symmetrical in the width direction W as seen in a plan view of the flow cell 10, and the one ends and another ends thereof are connected. The wall portion, which is at the side opposite the sheath liquid flow path 21 at the portion where the second sheath liquid flow path 22 and the first sheath liquid flow path 20 merge, is a side wall 26A.

The second sheath liquid flow path 22 is structured such that the sheath liquid 4 flows in the arrow R3 direction. The upstream side end portion in the flowing direction of the second sheath liquid flow path 22 (the arrow R3 direction) is connected to the sheath take-in opening 24. The sheath take-in opening 24 is common to the second sheath liquid flow path 22 and the first sheath liquid flow path 20, and the sheath liquid 4 that is introduced in from the sheath take-in opening 24 is diverged between the second sheath liquid flow path 22 and the first sheath liquid flow path 20. The second sheath liquid flow path 22 and the first sheath liquid flow path 20 have the same distance and sectional surface area. A supply tube 88 (details of which are described later, refer to FIG. 7) that supplies the sheath liquid 4 is connected to the sheath take-in opening 24. At the second sheath liquid flow path 22, the sheath liquid 4 that is supplied from the sheath take-in opening 24 flows toward the upstream side of the merging path 16. Two bent portions 22A, 22B are formed along the way of the flowing direction at the second sheath liquid flow path 22. The bent portions 22A, 22B are bent substantially 90°, and the corner portions of the portions that are bent are formed so as to be curved in rounded shapes.

The merging path 16 is formed along the length direction L at the center in the width direction W of the first plate-shaped body 12. The downstream end of the merging path 16 is formed further toward the central side in the length direction L of the first plate-shaped body 12 than the portion where the upstream ends of the first sheath liquid flow path 20 and the second sheath liquid flow path 22 are connected.

The downstream side end portions of the first sheath liquid flow path 20 and the second sheath liquid flow path 22 are connected together, and are connected to the sheath liquid flow path 21. The flows of the sheath liquid 4 from the second sheath liquid flow path 22 and the first sheath liquid flow path 20 are merged at the upstream side of the sheath liquid flow path 21, and are led to the sheath liquid flow path 21 and flow in the arrow R1 direction. The upper wall surface of the sheath liquid flow path 21 is structured from a portion of an upper wall portion 26C that also structures a merging portion 16A that is described later. The lower wall surface of the sheath liquid flow path 21 is structured from a portion of a lower wall portion 26B that also structures the merging portion 16A that is described later. The upper wall portion 26C is formed at the first plate-shaped body 12, and the lower wall portion 26B is formed at the second plate-shaped body 14. The upper wall surface and the lower wall surface of the sheath liquid flow path 21 are disposed parallel to one another and so as to face one another.

The opening portion of the sheath liquid flow path 21 onto the merging path 16 (hereinafter called "sheath liquid introducing opening 21A", refer to FIG. 4) is rectangular (oblong). The depth thereof (the length in the height direction H) is A, the length thereof in the direction orthogonal to the flowing direction (the arrow R1 direction) is width B, and the opening surface area thereof is S1. The sheath liquid flow path 21 is a flow path that is shaped as a pillar whose opening surface area is S1, and can also be called a flow path that is shaped as a rectangular body. In consideration of the flow rate of the sheath liquid 4 that is generally used and the flow rate of the sample liquid 2, the depth A is preferably in the range of 0.4 mm~0.8 mm. Note that, as described later, the depth A is the direction along the direction of introducing the sample liquid 2 (the height H direction).

The sample flow path 18 is a pillar-shaped flow path whose opening surface area is S2 that is described later, and is a flow path shaped as a rectangular body. The sample flow path 18 is formed in the second plate-shaped body 14, and is formed at the width direction center of the position corresponding to the boundary portion between the sheath liquid flow path 21 and the merging path 16. In other words, at the sheath liquid flow path 21 and the merging path 16 that are the same width and are continuous, the portion further toward the upstream side than the sample flow path 18 is the sheath liquid flow path 21, and the portion further toward the downstream side than the portion corresponding to the position where the sample flow path 18 is formed is the merging path 16. The boundary portion of the sheath liquid flow path 21 and the merging path 16 is the sheath liquid introducing opening 21A. The merging path 16 has a rectangular (oblong) cross-section.

The sample flow path 18 is formed by a hole that passes-through the second plate-shaped body 14 in the direction orthogonal to the plate surface of the second plate-shaped body 14. The cross-section of the sample flow path 18 is substantially rectangular (oblong), and the sample liquid is introduced in at an angle that is orthogonal with respect to the flowing direction of the fluid at the merging path 16 (the arrow R1 direction). Note that angles that are orthogonal include angles within a range of ±5° Namely, this includes angles within the range of 85°~95° as seen from the lateral side of the flow, with respect to the flowing direction of the fluid at the merging path 16 (the arrow R1 direction). The opening portion into the merging path 16 is a sample liquid introducing opening 18B, and the opening portion at the side opposite the sample liquid introducing opening 18B is sample liquid flow-in opening 18A. The length of the sample liquid introducing opening 18B in the flowing direction at the merging path 16 (the arrow R1 direction) is length C, the length thereof in the direction orthogonal to the flowing direction is width D. and the opening surface area thereof is S2. In consideration of the flow rate of the sheath liquid 4 that is generally used and the flow rate of the sample liquid 2, the width D is preferably within the range of 0.3 mm~1.0 mm. The opening surface area S2 of the sample liquid introducing opening 18B is preferably smaller than the opening surface area S1 of the sheath liquid introducing opening 21A.

The sample liquid flow-in opening 18A, which is the opening portion at the side opposite the merging path 16 at the sample flow path 18, is disposed at a position corresponding to a groove 72B that is formed in a case 72 that is described later, and is connected to a supply tube 80 that is described later. The supply tube 80 is disposed in the groove 72B, and the sample liquid 2 is introduced to the sample liquid flow-in opening 18A from the supply tube 80.

The merging portion 16A, at which the sample liquid 2 introduced-in from the sample flow path 18 and the sheath liquid 4 introduced-in from the sheath liquid flow path 21 are merged, is formed at the upstream side end portion in the flowing direction of the merging path 16 (the arrow R1 direction) (see FIG. 1). Namely, the merging portion 16A is a portion of the merging path 16.

The merging portion 16A is a flow path that is shaped as a rectangular body and is provided at the downstream side of the portion corresponding to the position where the sample flow path 18 is formed, and is a flow path that is orthogonal to the sample flow path 18. The opening surface area of the merging portion 16A is S1. The upstream end of the merging portion 16A is connected to the downstream end of the sheath liquid flow path 21. The boundary portion between the sheath liquid flow path 21 and the merging portion 16A is the sheath liquid introducing opening 21A. It can also be said that the merging portion 16A and the sheath liquid flow path 21 structure a single flow path that is shaped as a pillar (specifically, shaped as a rectangular body) of an opening surface area S1 and through which the sheath liquid flows. This path that is structured by the merging portion 16A and the sheath liquid flow path 21 is orthogonal to the sample flow path 18.

Figure 5:
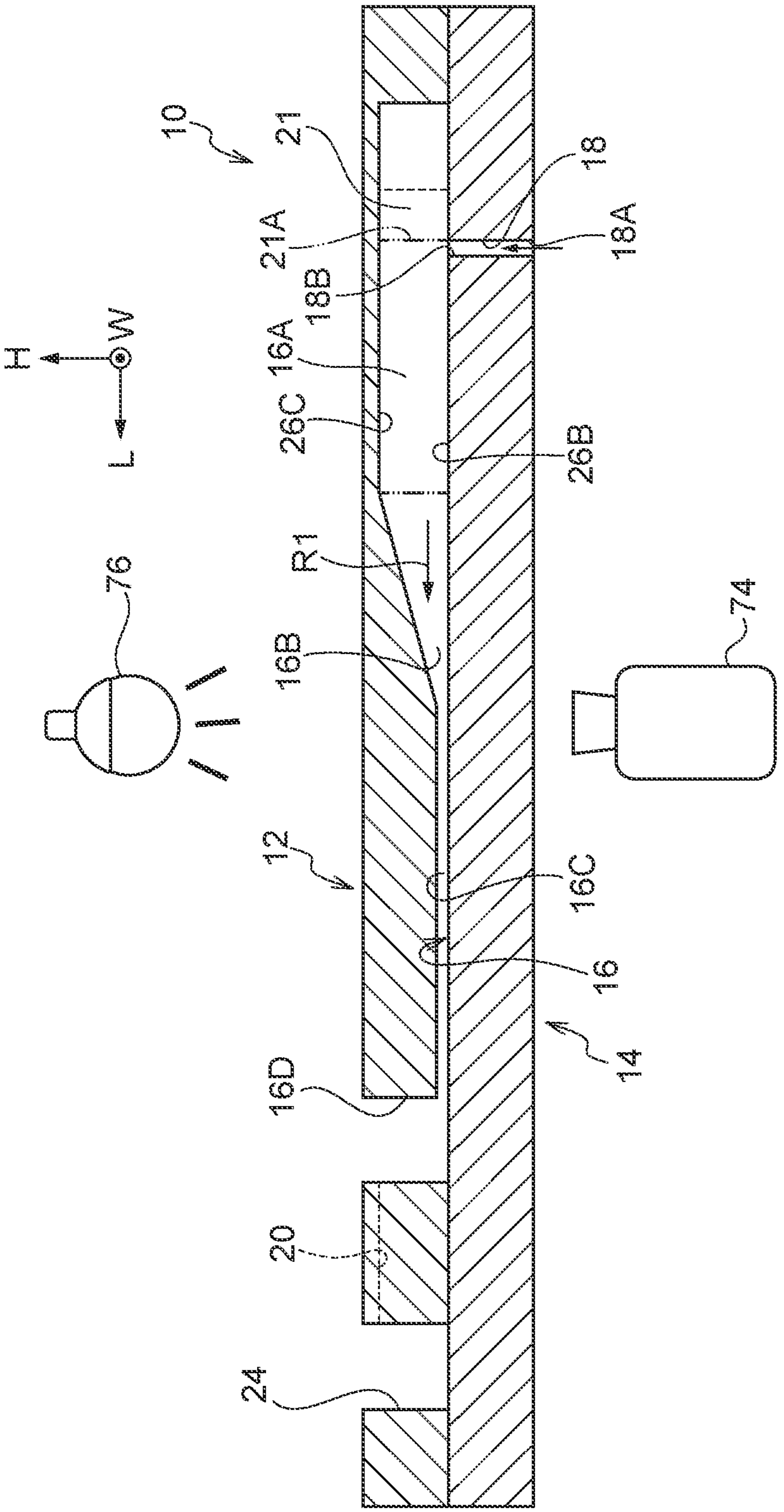
FIG. 5 is a cross-sectional view illustrating the flow cell relating to the first embodiment.

The sample liquid introducing opening 18B from which the sample liquid 2 is introduced is formed in the wall surface that is at one side in the depth direction of the merging portion 16A (the arrow H direction) (see FIG. 5). More specifically, the merging portion 16A has the lower wall portion 26B and the upper wall portion 26C that serve as a pair of wall surfaces that face one another in the depth direction (the arrow H direction). The sample flow path 18 is provided so as to open at the lower wall portion 26B that serves as one wall surface that is at one side facing the merging portion 16A. The lower wall portion 26B is structured by one side surface of the second plate-shaped body 14, and the sample liquid 2 is introduced into the merging portion 16A from the sample liquid introducing opening 18B. In other words, the sample flow path 18 introduces the sample liquid 2 at an angle of 90° (±5°) with respect to the flowing direction of the merging path 16 (the arrow R1 direction), from the lower wall portion 26B that is at one side facing the merging portion 16A. The upper wall portion 26C and the lower wall portion 26B extend from the merging portion 16A via the sheath liquid flow path 21 to the portion where the first sheath liquid flow path 20 and the second sheath liquid flow path 22 are connected. Accordingly, from the merging portion 16A through the sheath liquid flow path 21 and up to the connected portion of the first sheath liquid flow path 20 and the second sheath liquid flow path 22, the top surface is flush at the upper wall portion 26C, and the bottom surface is flush at the lower wall portion 26B.

The sheath liquid introducing opening 21A from which the sheath liquid 4 is introduced is formed at the portion surrounded by the lower wall portion 26B, the upper wall portion 26C, and the pair of side wall portions that face one another in the width direction W. The sheath liquid 4 is introduced from the sheath liquid flow path 21 into the merging portion 16A in the arrow R1 direction, and the sample liquid 2 is made to flow in the arrow R1 direction along the lower wall portion 26B by the sheath liquid 4.

Figure 6:
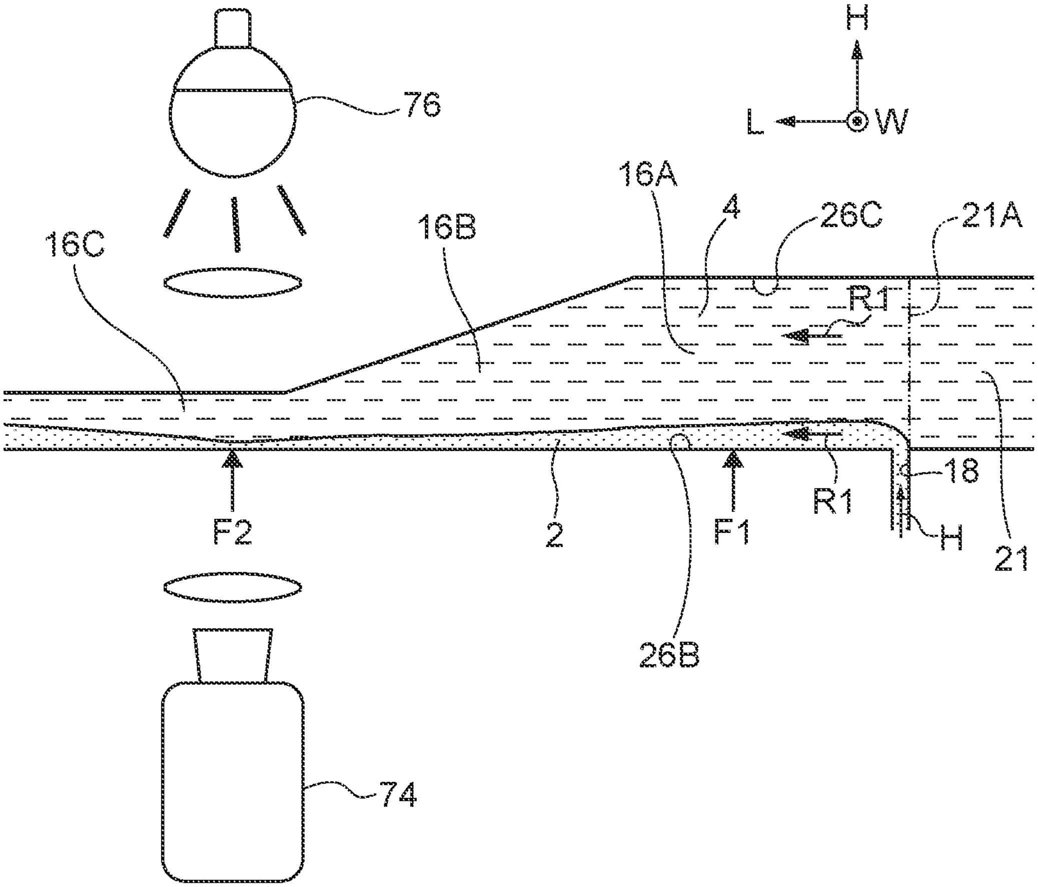
FIG. 6 is a cross-sectional view, along the length direction of a flow path, schematically illustrating the flowing directions of the sample liquid and the sheath liquid at the flow path of the flow cell relating to the first embodiment, and a portion of a measuring device.

A tapered portion 16B, whose depth gradually becomes more shallow toward the downstream side, is provided at the upper wall portion 26C of the merging path 16, further toward the downstream side in the flowing direction (the arrow R1 direction) than the merging portion 16A of the merging path 16 (see FIG. 5 and FIG. 6). The tapered portion 16B is formed only at the upper wall portion 26C of the merging path 16. The lower wall portion 26B is flush along the entire region of the merging path 16. In the present embodiment, the tapered portion 16B is a shape at which the interval between the lower wall portion 26B and the upper wall portion 26C gradually narrows. The angle of inclination of the tapered portion 16B with respect to the surface direction of the flow cell 10 (in the present embodiment, the surface direction of the lower wall portion 26B) is, for example, 2°~15°.

A flat portion 16C, whose depth is shallower than the merging portion 16A, is formed further toward the downstream side in the flowing direction (the arrow R1 direction) than the tapered portion 16B of the merging path 16. The tapered portion 16B is structured so as to connect the upper wall portion 26C of the merging portion 16A and the flat portion 16C.

A camera 74 serving as an imaging means that captures images of the sample liquid 2 is disposed at a position facing the flat portion 16C, at the exterior of the flow cell 10 (see FIG. 5 and FIG. 6). The camera 74 is disposed at the side of the merging path 16 at which side the sample liquid 2 is introduced in, with the flow cell 10 located therebetween, i.e., is disposed at the second plate-shaped body 14 side.

As illustrated in FIG. 1 through FIG. 3, a discharge opening 16D from which fluid (the sample liquid 2 and the sheath liquid 4) is discharged is formed at the downstream side end portion in the flowing direction of the merging path 16 (the arrow R1 direction). An unillustrated discharge tube is connected to the discharge opening 16D, and fluid (the sample liquid 2 and the sheath liquid 4) are discharged out from the discharge opening 16D to the discharge tube.

At the flow cell 10 of the present embodiment, flow rate J per unit time of the sample liquid 2 and flow rate L per unit time of the sheath liquid 4 are controlled such that the relationship of following formula (1) is satisfied. Note that, as described above, S1 is the opening surface area of the sheath liquid introducing opening 21A onto the merging portion 16A, and S2 is the opening surface area of the sample liquid introducing opening 18B onto the merging path 16.

$$(L/S1)/(J/S2) \geqq 0.7 \quad (1)$$

Figure 4:
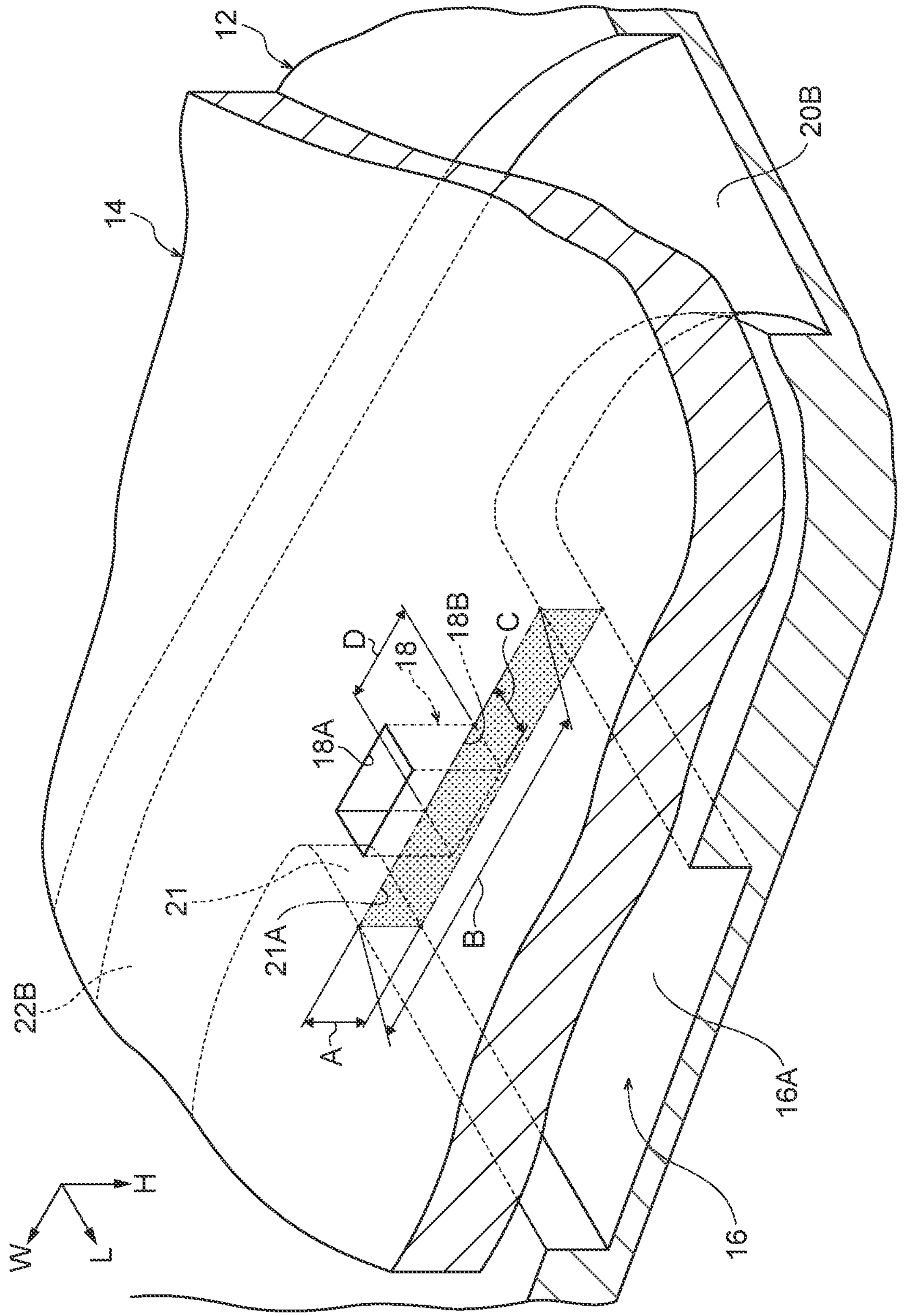
FIG. 4 is an enlarged perspective view illustrating a vicinity of a merging portion of a sample liquid and a sheath liquid of the flow cell relating to the first embodiment.

Note that, in the present embodiment, as illustrated in FIG. 4, the sheath liquid introducing opening 21A is rectangular (oblong), and therefore, the opening surface area S1 can be expressed as depth A×width B. Further, the sample liquid introducing opening 18B also is rectangular (oblong), and therefore, the opening surface area S2 can be expressed as width D×length C.

By controlling the flow rate J of the sample liquid 2 and the flow rate L of the sheath liquid 4 so as to satisfy the relationship of formula (1), the sample liquid 2 that flows in the merging path 16 flows along the lower wall portion 26B, and mixing-in of the sheath liquid 4 between the sample liquid 2 and the wall surface of the lower wall portion 26B is suppressed.

The flow cell 10 is substantially transparent, and is formed of a resin for example. For example, a material having visible light transmissivity of greater than or equal to around 90% such as PMMA, COP, PDMS, PP, glass or the like, or the like is selected as the material of the flow cell 10. The merging path 16, the sample flow path 18, the first sheath liquid flow path 20, the second sheath liquid flow path 22 and the like are formed in the first plate-shaped body 12 by laser machining or the like. The flow cell 10 is formed by the first plate-shaped body 12 and the second plate-shaped body 14 being laminated together. In the present embodiment, as an example, the first plate-shaped body 12 and the second plate-shaped body 14 are laminated together by thermocompression bonding. The flow cell 10 is compact and can be manufactured easily. Therefore, the amount of the sample liquid and the amount of the sheath liquid that are needed can be reduced. Further, when a problem arises at the flow cell 10, the problem can be handled quickly by replacing the flow cell 10 with a new one.

(Structure of Measuring Device)

Figure 7:
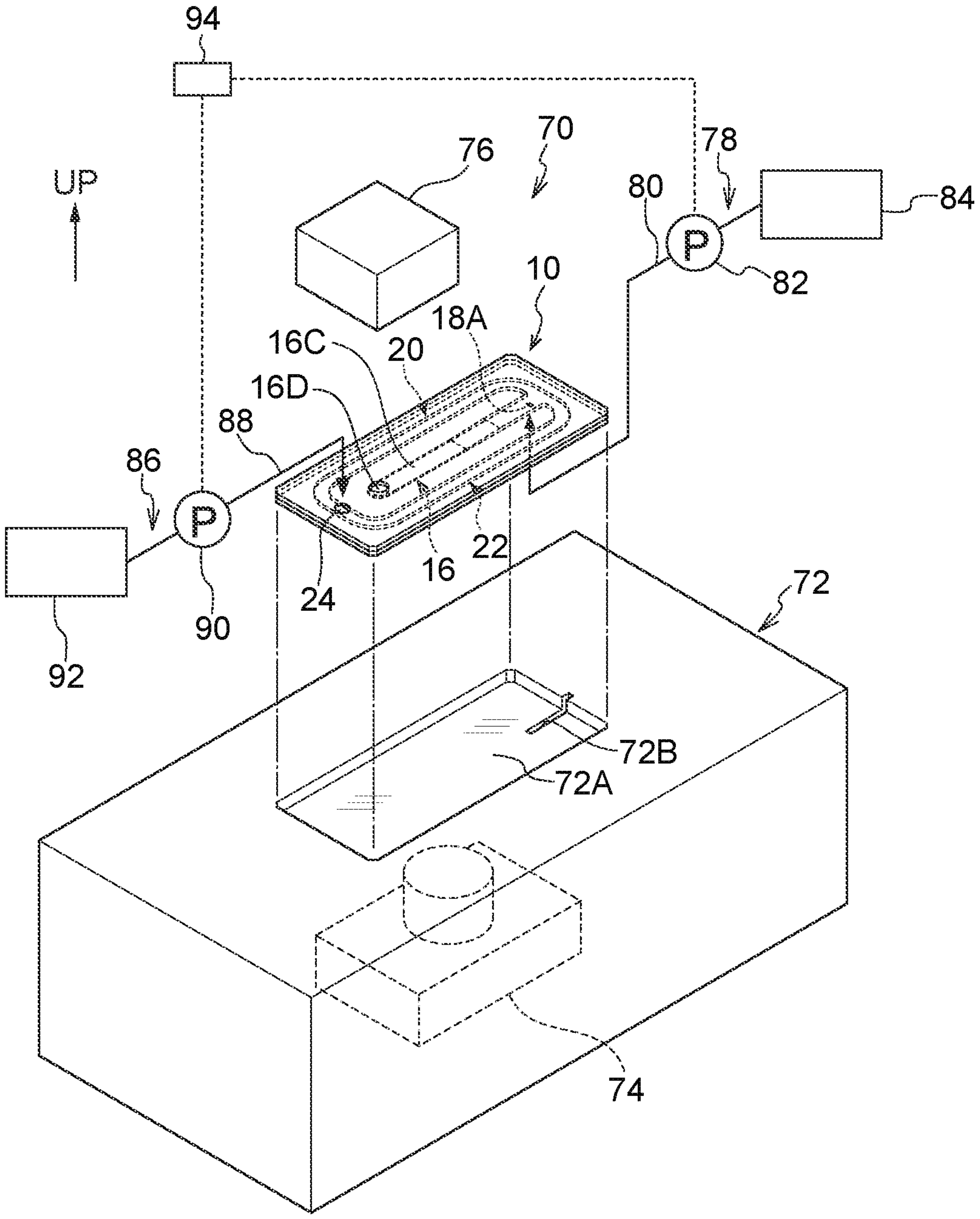
FIG. 7 is a perspective view illustrating an example of the measuring device that captures an image of the sample liquid supplied to the flow cell relating to the first embodiment.

The measuring device 70 of the present embodiment is illustrated in a perspective view in FIG. 7. The measuring device 70 captures an image of the sample liquid 2 that flows through the flow cell 10, by using the camera 74.

The measuring device 70 has the case 72 in which the flow cell 10 is disposed. The case 72 has a concave portion 72A into which the flow cell 10 is inserted, and further has the groove 72B in which is disposed the supply tube 80 that supplies the sample liquid 2 to the sample flow path 18. The position, which includes the concave portion 72A, of the case 72 is formed of a transparent member (e.g., glass or the like). The camera 74, which serves as the imaging means and is provided at a position facing the flow cell 10, is provided at the interior of the case 72. A light source 76 is provided at the upper side of the case 72 at a position facing the camera 74 with the flow cell 10 located therebetween. The camera 74 is disposed at a position facing the flat portion 16C of the merging path 16 of the flow cell 10.

The measuring device 70 has a first supplying device 78 that serves as a sample liquid supplying section. The first supplying device 78 has the supply tube 80 whose one end portion is connected to the sample liquid flow-in opening 18A, a pump 82 provided midway along the supply tube 80, and a sample storing portion 84 connected to the another end portion of the supply tube 80 and in which the sample liquid 2 is stored. The sample liquid 2 is supplied from the first supplying device 78 to the sample flow path 18.

The measuring device 70 has a second supplying device 86 serving as a sheath supplying section. The second supplying device 86 has the supply tube 88 whose one end portion is connected to the sheath take-in opening 24, a pump 90 provided midway along the supply tube 88, and a tank 92 connected to the another end portion of the supply tube 88 and in which the sheath liquid 4 is stored. The sheath liquid 4 is supplied from the second supplying device 86 via the first sheath liquid flow path 20 and the second sheath liquid flow path 22 to the sheath liquid flow path 21.

The measuring device 70 has a control section 94. The control section 94 has a CPU (Central Processing Unit), a ROM (Read Only Memory), a RAM (Random Access Memory), and a storage which are not illustrated. Various programs, data and the like for driving the measuring device 70 are stored in the storage. The control section 94 is electrically connected to the camera 74, the light source 76, the pump 82 and the pump 90, and controls these respective sections.

(Operation and Effects)

Operation and effects of the present embodiment are described next.

At the measuring device 70, due to the pump 90 being driven, the sheath liquid 4 is supplied from the tank 92 to the flow cell 10. In the present embodiment, first the sheath liquid 4 is supplied to the flow cell 10, and, after the sheath liquid 4 has been introduced into the merging portion 16A of the merging path 16, the supplying of the sample liquid 2 is started. Note that, although the sheath liquid 4 is supplied first in the present embodiment, the sample liquid 2 may be supplied first, or the sheath liquid 4 and the sample liquid 2 may be supplied simultaneously.

The sheath liquid 4 is diverged into the first sheath liquid flow path 20 and the second sheath liquid flow path 22 that are branched-off from the sheath take-in opening 24. At the first sheath liquid flow path 20, the sheath liquid 4 flows in the arrow R2 direction toward the sheath liquid flow path 21. At the second sheath liquid flow path 22, the sheath liquid 4 flows in the arrow R3 direction toward the sheath liquid flow path 21. Due to the sheath liquid 4 flowing through the bent portions 20A, 20B, 22A, 22B, the pressure loss becomes large.

The sheath liquid 4 of the first sheath liquid flow path 20 and the sheath liquid 4 of the second sheath liquid flow path 22 are merged at the upstream side of the sheath liquid flow path 21, and the flowing direction of the sheath liquid 4 after the merging is changed substantially orthogonally, and the sheath liquid 4 flows into the sheath liquid flow path 21. The sheath liquid 4 that has flowed into the sheath liquid flow path 21 flows in the arrow R1 direction and, via the sheath liquid introducing opening 21A, is introduced into the merging portion 16A of the merging path 16.

On the other hand, due to the pump 82 being driven, the sample liquid 2 is supplied from the sample storing portion 84 through the sample liquid flow-in opening 18A of the flow cell 10 to the sample flow path 18. The sample liquid 2, which has been supplied from the sample liquid flow-in opening 18A, flows through the sample flow path 18, and is introduced from the sample liquid introducing opening 18B into the merging portion 16A of the merging path 16.

Due to the output of the pump 90 and the pump 82 being controlled by the control section 94, the sheath liquid 4 is supplied at flow rate L per unit time, and the sample liquid 2 is supplied at flow rate J per unit time, such that the relationship of above formula (1) is satisfied.

The sample liquid 2 that has been introduced into the merging portion 16A is merged with the sheath liquid 4. The sample liquid 2 is introduced in orthogonal direction H that is orthogonal to the flowing direction of the sheath liquid 4 (the arrow R1 direction). The sample liquid 2 flows through the merging path 16 in the arrow R1 direction while contacting the lower wall portion 26B (see FIG. 6).

The sheath liquid 4 that has been introduced into the merging portion 16A flows in the arrow R1 direction so as to push the sample liquid 2 against the lower wall portion 26B by the tapered portion 16B, and the sample liquid 2 contacts the lower wall portion 26B (refer to the arrow F1 portion in FIG. 6). While advancing toward the downstream side, at the tapered portion 16B of the merging path 16, the sample liquid 2 is drawn-out in a flat shape along the lower wall portion 26B, and the thickness of the sample liquid 2 gradually becomes thinner. Then, at the upstream portion (the arrow F2 portion in FIG. 6) of the flat portion 16C of the merging path 16, the sample liquid 2 flows in a state in which the thickness thereof has become thin and while contacting the lower wall portion 26B.

Therefore, due to the sample liquid 2 being imaged by the camera 74 at the upstream portion of the flat portion 16C of the merging path 16 (as an example, in the present embodiment, in a range of around 2 mm from the start position of the flat portion 16C), the sample liquid 2 can be kept within the depth of field. Further, because the sheath liquid 4 is not interposed between the camera 74 and the sample liquid 2, the sample liquid 2 is not affected by diffused reflection due to the sheath liquid 4, and a clear image can be acquired.

Further downstream of the flat portion 16C of the merging path 16, the sample liquid 2 and the sheath liquid 4 are discharged out from the discharge opening 16D to the discharge tube (not illustrated).

At the flow cell 10 of the present embodiment, the sample flow path 18 is formed independently by a hole that passes-through the second plate-shaped body 14 in a direction orthogonal to the plate surface. Therefore, as compared with a case of forming a sample flow path in the first plate-shaped body 12 in which another flow path has been formed, the structure can be made to be simple, and the flow cell 10 can be manufactured easily.

Further, at the flow cell 10 of the present embodiment, the flow rate J per unit time of the sample liquid 2 and the flow rate L per unit time of the sheath liquid 4 are controlled such that the relationship of above formula (1) is satisfied. Therefore, mixing together of the sheath liquid 4 and the sample liquid 2 is suppressed, and it is difficult for the sheath liquid 4 to flow-in between the sample liquid 2 and the lower wall portion 26B. Due thereto, the sample liquid 2 can be made to flow through the merging path 16 in the arrow R1 direction while being made to contact the lower wall portion 26B.

Further, in the present embodiment, the sheath liquid introducing opening 21A is rectangular (oblong). Accordingly, the sheath liquid introducing opening 21A can be formed easily by a portion of the lower wall portion 26B that is a flat surface. Further, the sample liquid introducing opening 18B also is rectangular (oblong), and one side thereof is disposed in the same direction as the width direction W, and the sample liquid 2 is introduced into the flow of the sheath liquid 4 that is from the sheath liquid flow path 21, at the same length in the width direction W (the length in the flowing direction R1). Accordingly, the sample liquid 2 applies a resistance force that is uniform in the width direction W to the flow of the sheath liquid 4. Therefore, the sample liquid 2 forms a laminar flow of a uniform thickness, and flows through the merging portion 16A. Therefore, mixing together of the sample liquid 2 with the sheath liquid 4 is suppressed.

Further, at the flow cell 10 of the present embodiment, due to the sample liquid 2 being pushed-against the lower wall portion 26B by the sheath liquid 4 due to the tapered portion 16B, the sample flow path 18 is drawn-out in a planar form such that the thickness becomes thinner along the lower wall portion 26B. The camera 74 is disposed at a position facing the flat portion 16C of the flow cell 10. Due to the camera 74 imaging the sample liquid 2 that flows at the flat portion 16C, a clear image of the sample liquid 2, at which mixing-together with the sheath liquid 4 is suppressed, can be acquired.

Further, the lower surface of the sheath liquid flow path 21 is formed by a portion of the flush lower wall portion 26B that forms the lower surface of the merging portion 16A as well. Therefore, the sheath liquid 4 can be smoothly introduced into the merging path 16, and mixing of the sample liquid 2 and the sheath liquid 4 can be suppressed.

Note that, in the present embodiment, the sheath liquid introducing opening 21A and the sample liquid introducing opening 18B are rectangular, but may be another shape such as circular or oval for example.

Further, although the tapered portion 16B and the flat portion 16C are provided in the present embodiment, these portions do not necessarily have to be provided, and the depth of the merging path 16 may be constant. In this case as well, at the portion, at which the sample liquid 2 contacts the lower wall portion 26B, at the upstream side of the merging path 16, a clear image of the sample liquid 2, at which mixing-together with the sheath liquid 4 is suppressed, can be acquired.

In the present embodiment, the sheath liquid 4 is supplied so as to be divided between the first sheath liquid flow path 20 and the second sheath liquid flow path 22. However, embodiments do not necessarily have to be structured in this way. For example, a through-hole that supplies the sheath liquid 4 may be provided in the side wall 26A, and the sheath liquid 4 may be supplied from the supply tube 88.

Further, in the present embodiment, the camera 74 is disposed at the side of the merging path 16 at which the sample liquid 2 is introduced, with the flow cell 10 therebetween. However, the camera 74 may be disposed at and capture images at the opposite side (the first plate-shaped body 12 side) with the flow cell 10 therebetween.

In the present embodiment, the flow rate L and the flow rate J are controlled by the control section 94 that is provided at the measuring device 70. However, the flow rate L and the flow rate J may be controlled manually. For example, a method can be employed in which the outputs of the pumps 82, 90 are adjusted manually, and the sample liquid 2 and the sheath liquid 4 are fed, such that above formula (1) is satisfied.

Second Embodiment

A measuring device and sample liquid feeding method of a second embodiment relating to the present disclosure are described next. In the present embodiment, portions that are similar to those of the first embodiment are illustrated while being denoted by the same reference numerals, and detailed description thereof is omitted.

Figure 11:
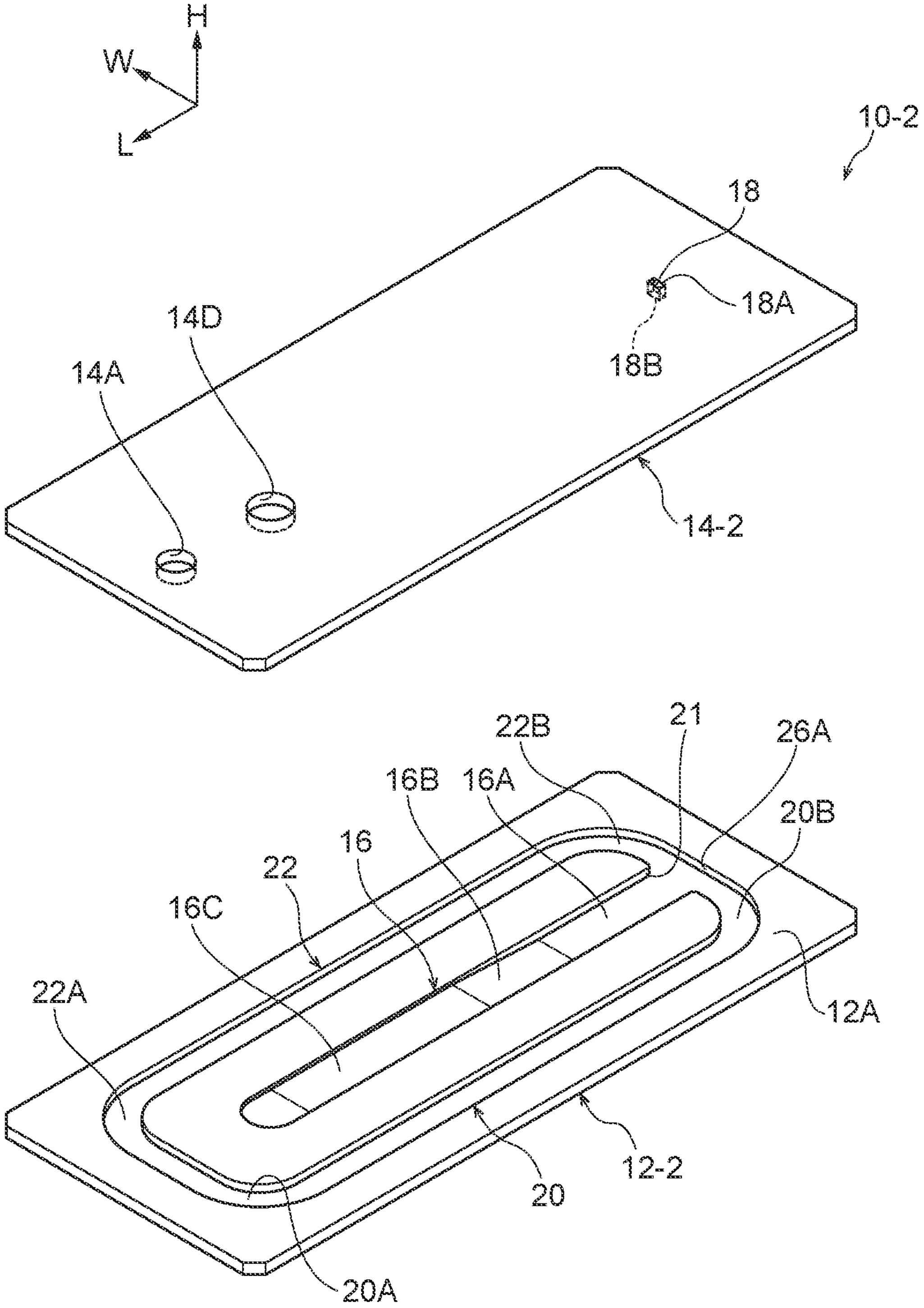
FIG. 11 is an exploded perspective view illustrating a flow cell relating to a second embodiment.

A flow cell 10-2 of a measuring device 70-2 (see FIG. 13) of the present embodiment is illustrated in an exploded perspective view in FIG. 11. Note that, in FIG. 11, the up-down direction of the flow cell 10-2 is illustrated in a state coinciding with the up-down direction of FIG. 13.

The flow cell 10-2 of the present embodiment is a plate-shaped member that is substantially rectangular. The flow cell 10-2 is a structure in which a first plate-shaped body 12-2 that is shaped as a flat plate and a second plate-shaped body 14-2 that is shaped as a flat plate are laminated together in a state of planarly contacting one another. In the present embodiment, the first plate-shaped body 12-2 is disposed at the lower side, and the second plate-shaped body 14-2 is disposed at the upper side, and the top and bottom are opposite those of the arrangement of the first plate-shaped body 12 and the second plate-shaped body 14 of the first embodiment.

The first plate-shaped body 12-2 has a shape similar to that of the first plate-shaped body 12 of the first embodiment, except for the point that the discharge opening 16D and the sheath take-in opening 24 are not formed in the first plate-shaped body 12 of the first embodiment. The second plate-shaped body 14-2 has a shape similar to that of the second plate-shaped body 14 of the first embodiment, except for the point that a discharge opening 14D and a sheath take-in opening 14A are formed in the second plate-shaped body 14 of the first embodiment.

The discharge opening 14D is formed so as to pass-through the second plate-shaped body 14-2 in the thickness direction at the end portion at the downstream side in the flowing direction of the merging path 16 (the arrow R1 direction). An unillustrated discharge tube is connected to the discharge opening 14D, and fluid (the sample liquid 2 and the sheath liquid 4) are discharged from the discharge opening 14D to the discharge tube.

The sheath take-in opening 14A is formed so as to pass-through the second plate-shaped body 14-2 in the thickness direction at the end portion at the upstream side in the flowing direction of the first sheath liquid flow path 20 (the arrow R2 direction). The supply tube 88 (see FIG. 13) that supplies the sheath liquid 4 is connected to the sheath take-in opening 14A. The sheath liquid 4 is supplied from the sheath take-in opening 14A, and the sheath liquid 4 flows toward the upstream side of the merging path 16.

The sample liquid flow-in opening 18A, which is the opening portion of the sample flow path 18 at the side opposite the merging path 16, is connected to the supply tube 80, and the sample liquid 2 is introduced into the sample liquid flow-in opening 18A from the supply tube 80.

Figure 13:
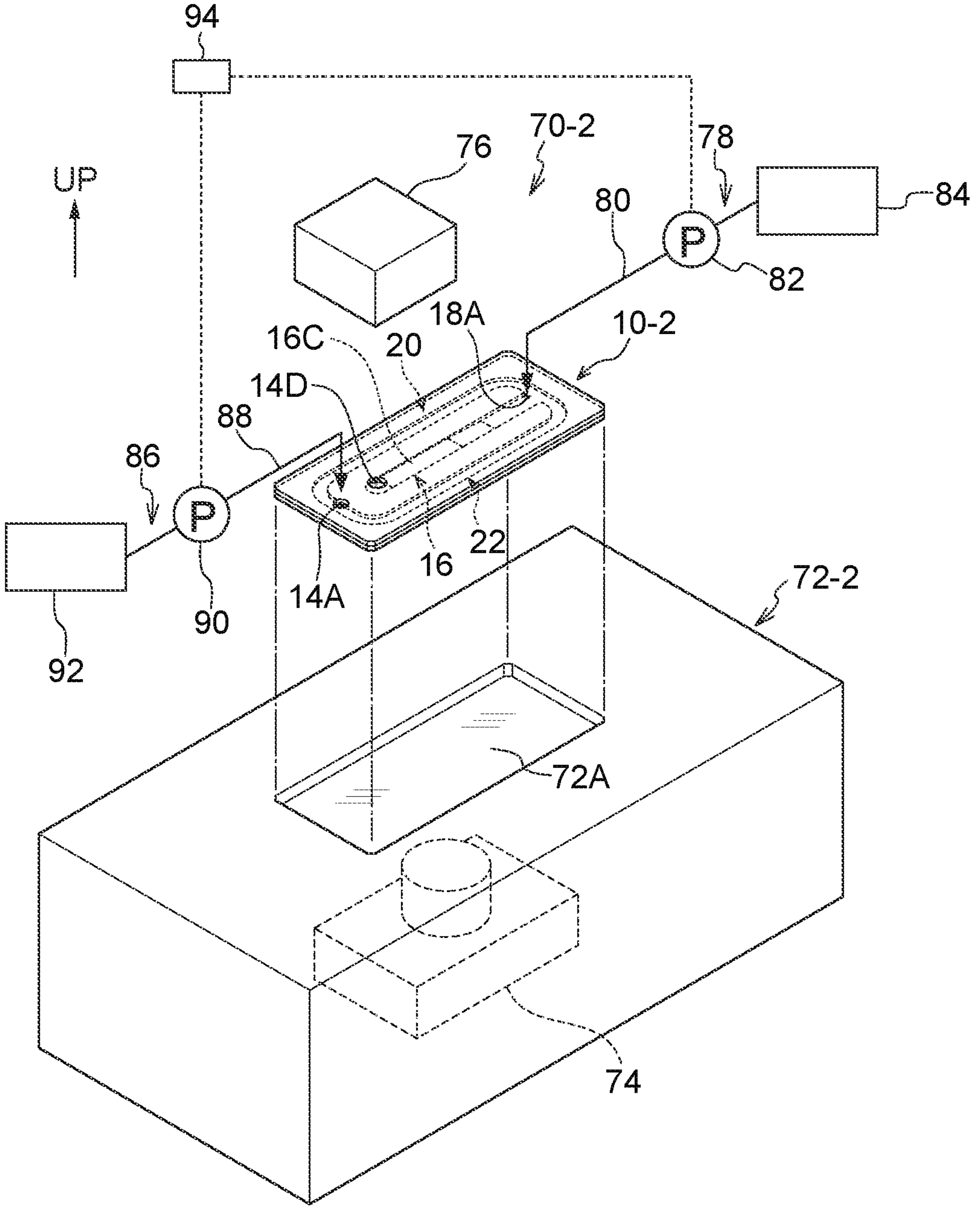
FIG. 13 is a perspective view illustrating an example of the measuring device that captures an image of the sample liquid supplied to the flow cell relating to the second embodiment.

A case 72-2 of the measuring device 70-2 of the present embodiment has a shape that is similar to that of the case 72 of the first embodiment, except for the point that the concave portion 72A is not formed in the case 72 of the first embodiment (see FIG. 13). In the present embodiment, the supplying and the discharging of the sample liquid 2 and the sheath liquid 4 are carried out from the upper side (the second plate-shaped body 14-2 side) of the flow cell 10-2.

(Operation and Effects)

Operation and effects of the present embodiment are described next.

At the measuring device 70-2, due to the pump 90 being driven, the sheath liquid 4 is supplied from the tank 92 to the flow cell 10-2. The sheath liquid 4 is supplied from the sheath take-in opening 14A, and, in the same way as in the first embodiment, the sheath liquid 4 is diverged into the first sheath liquid flow path 20 and the second sheath liquid flow path 22 respectively, and, at a path that is similar to the first embodiment, goes through the sheath liquid introducing opening 21A and is introduced into the merging portion 16A of the merging path 16.

On the other hand, due to the pump 82 being driven, the sample liquid 2 is supplied from the sample storing portion 84 through the sample liquid flow-in opening 18A of the flow cell 10-2 to the sample flow path 18. The sample liquid 2, which has been supplied from the sample liquid flow-in opening 18A, flows through the sample flow path 18, and is introduced from the sample liquid introducing opening 18B into the merging portion 16A of the merging path 16.

In the same way as in the first embodiment, due to the output of the pump 90 being controlled by the control section 94, the sheath liquid 4 is supplied at flow rate L per unit time, and the sample liquid 2 is supplied at flow rate J per unit time, such that the relationship of formula (1) is satisfied.

The sample liquid 2 that has been introduced into the merging portion 16A is merged with the sheath liquid 4. The sample liquid 2 is introduced in orthogonal direction H that is orthogonal to the flowing direction of the sheath liquid 4 (the arrow R1 direction). The sample liquid 2 flows through the merging path 16 in the arrow R1 direction while contacting the lower wall portion 26B (in the present embodiment, the wall surface that is located at the upper side in the up-down direction).

Figure 12:
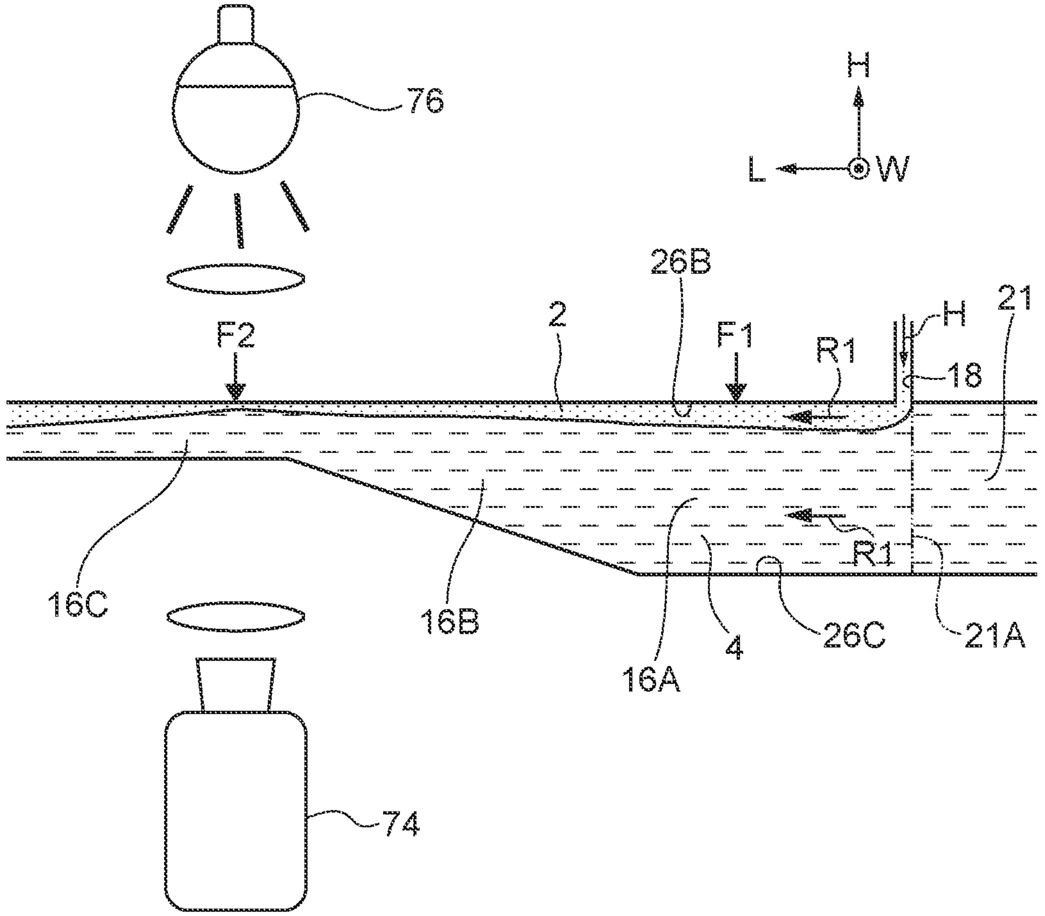
FIG. 12 is a cross-sectional view, along the length direction of the flow path, schematically illustrating the flowing directions of the sample liquid and the sheath liquid at the flow path of the flow cell relating to the second embodiment, and a portion of a measuring device.

The sheath liquid 4 that has been introduced into the merging portion 16A flows in the arrow R1 direction (see FIG. 12) so as to push the sample liquid 2 against the lower wall portion 26B by the tapered portion 16B, and the sample liquid 2 contacts the lower wall portion 26B (refer to the arrow F1 portion in FIG. 12). While advancing toward the downstream side, at the tapered portion 16B of the merging path 16, the sample liquid 2 is drawn-out in a flat shape along the lower wall portion 26B, and the thickness of the sample liquid 4 gradually becomes thinner. Then, at the upstream portion (the arrow F2 portion in FIG. 12) of the flat portion 16C of the merging path 16, the sample liquid 2 flows in a state in which the thickness thereof has become thin and while contacting the lower wall portion 26B.

Therefore, due to the sample liquid 2 being imaged by the camera 74 at the upstream portion of the flat portion 16C of the merging path 16 (as an example, in the present embodiment, in a range of around 2 mm from the position of the start of the flat portion 16C), the sample liquid 2 can be kept within the depth of field.

Further downstream of the flat portion 16C of the merging path 16, the sample liquid 2 and the sheath liquid 4 are discharged out from the discharge opening 14D to the discharge tube (not illustrated).

At the flow cell 10-2 of the present embodiment, the sample flow path 18, the discharge opening 14D and the sheath take-in opening 14A are formed by holes that pass-through the second plate-shaped body 14-2 in a direction orthogonal to the plate surface.

Therefore, as compared with a case of forming a sample flow path in the first plate-shaped body 12-2 in which another flow path has been formed, the structure can be made to be simple, and the flow cell 10-2 can be manufactured easily.

Further, at the flow cell 10-2 of the present embodiment, the flow rate J per unit time of the sample liquid 2 and the flow rate L per unit time of the sheath liquid 4 are controlled such that the relationship of above formula (1) is satisfied. Therefore, mixing together of the sheath liquid 4 and the sample liquid 2 is suppressed, and it is difficult for the sheath liquid 4 to flow-in between the sample liquid 2 and the lower wall portion 26B. Due thereto, the sample liquid 2 can be made to flow through the merging path 16 in the arrow R1 direction while being made to contact the lower wall portion 26B.

Further, in the present embodiment, the sheath liquid introducing opening 21A is rectangular (oblong). Accordingly, the sheath liquid introducing opening 21A can be formed easily by a portion of the lower wall portion 26B that is a flat surface. Further, the sample liquid introducing opening 18B also is rectangular (oblong), and one side thereof is disposed in the same direction as the width direction W, and the sample liquid 2 is introduced into the flow of the sheath liquid 4 that is from the sheath liquid flow path 21, at the same length in the width direction W (the length in the flowing direction R1). Accordingly, the sample liquid 2 applies a resistance force that is uniform in the width direction W to the flow of the sheath liquid 4. Therefore, the sample liquid 2 forms a laminar flow of a uniform thickness, and flows through the merging portion 16A. Therefore, mixing together of the sample liquid 2 with the sheath liquid 4 is suppressed.

Further, at the flow cell 10-2 of the present embodiment, due to the sample liquid 2 being pushed-against the lower wall portion 26B by the sheath liquid 4 due to the tapered portion 16B, the sample flow path 18 is drawn-out in a planar form such that the thickness becomes thinner along the lower wall portion 26B. The camera 74 is disposed at a position facing the flat portion 16C of the flow cell 10-2, and due to the camera 74 imaging the sample liquid 2 that flows at the flat portion 16C, a clear image of the sample liquid 2, at which mixing-together with the sheath liquid 4 is suppressed, can be acquired.

Further, the upper surface of the sheath liquid flow path 21 is formed by a portion of the flush lower wall portion 26B that forms the upper surface of the merging portion 16A as well. Therefore, the sheath liquid 4 can be smoothly introduced into the merging path 16, and mixing of the sample liquid 2 and the sheath liquid 4 can be suppressed.

Note that, in the present embodiment, the sheath liquid introducing opening 21A and the sample liquid introducing opening 18B are rectangular, but may be another shape such as circular or oval for example.

Further, although the tapered portion 16B and the flat portion 16C are provided in the present embodiment, these portions do not necessarily have to be provided, and the depth of the merging path 16 may be constant. In this case as well, at the portion, at which the sample liquid 2 contacts the lower wall portion 26B, at the upstream side of the merging path 16, a clear image of the sample liquid 2, at which mixing-together with the sheath liquid 4 is suppressed, can be acquired.

In the present embodiment, the sheath liquid 4 is supplied so as to be divided between the first sheath liquid flow path 20 and the second sheath liquid flow path 22. However, embodiments do not necessarily have to be structured in this way. For example, a through-hole that supplies the sheath liquid 4 may be provided at the side wall 26A, and the sheath liquid 4 may be supplied from the supply tube 88.

Further, in the present embodiment, the camera 74 is disposed at the first plate-shaped body 12 side of the merging path 16, with the flow cell 10-2 therebetween. However, the camera 74 may be disposed at and capture images at the opposite side (the second plate-shaped body 14 side) with the flow cell 10-2 therebetween.

In the present embodiment, the flow rate L and the flow rate J are controlled by the control section 94 that is provided at the measuring device 70-2. However, the flow rate L and the flow rate J may be controlled manually. For example, a method can be employed in which the outputs of the pumps 82, 90 are adjusted manually, and the sample liquid 2 and the sheath liquid 4 are fed, such that above formula (1) is satisfied.

Note that, although embodied forms of the present disclosure have been described by using the embodiments as examples, these embodiments are examples, and the present disclosure can be implemented by being modified in various ways within a scope that does not depart from the gist thereof. Further, the scope of the right of the present disclosure is not limited by these embodiments, and it goes without saying that the present disclosure can be embodied in various forms within a scope that does not depart from the gist thereof.

[Evaluation Results of Simulations]

A sample liquid and a sheath liquid were made to flow by using the flow cell 10 of the first embodiment, and whether or not the sample liquid 2 flowed while contacting the lower wall portion 26B from the merging portion 16A until reaching the flat portion 16C was evaluated by simulations. The "O" in the results of evaluation means that the sample liquid 2 flowed while contacting the lower wall portion 26B from the merging portion 16A until reaching the flat portion 16C, and the "X" means that the sample liquid flowed while being apart from the lower wall portion 26B from the merging portion 16A until reaching the flat portion 16C.

Figure 8:
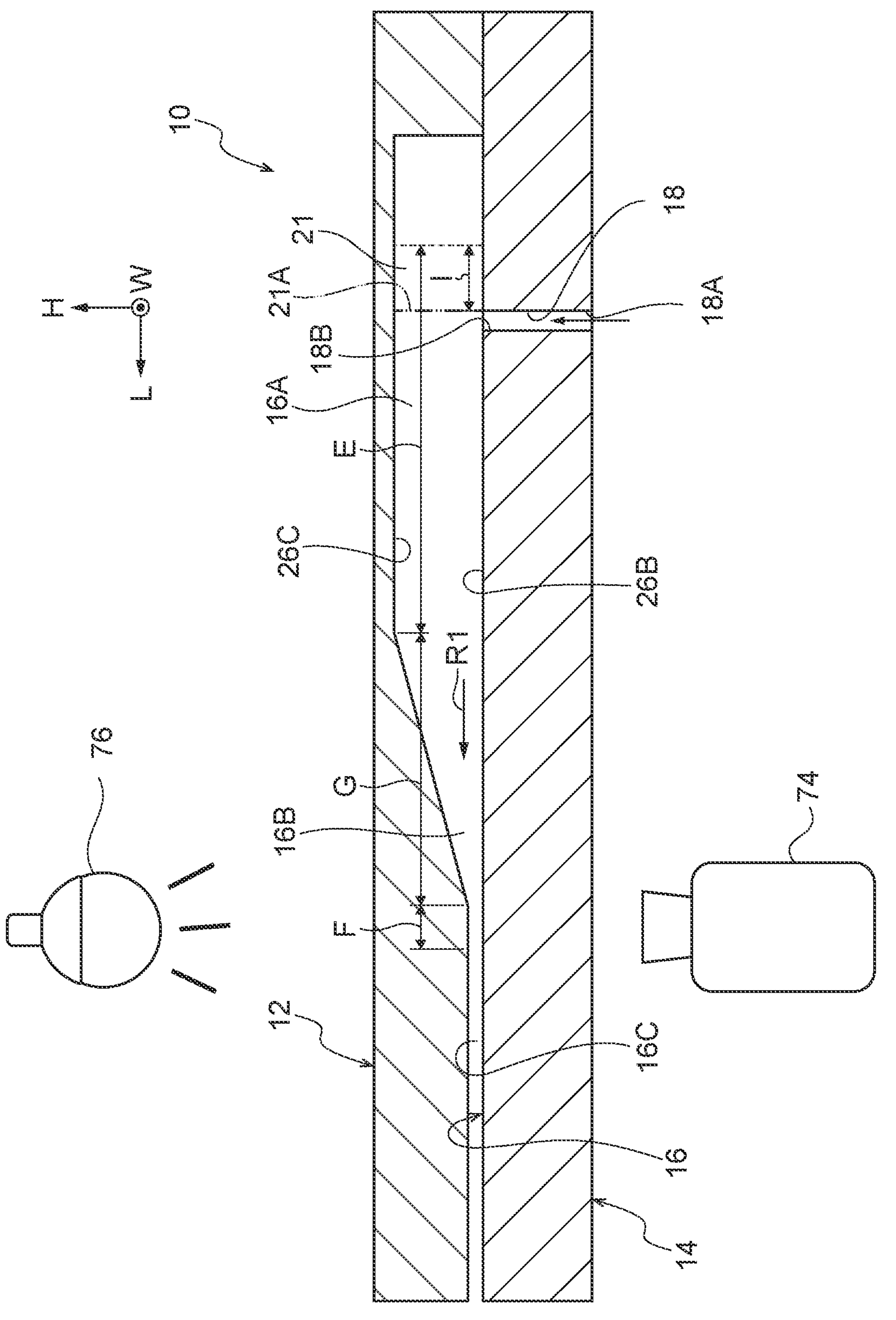
FIG. 8 is an enlarged sectional view, along the length direction of the flow path, schematically illustrating the flowing directions of the sample liquid and the sheath liquid at the flow path of the flow cell relating to the first embodiment, and a portion of the measuring device.

In Evaluation 1 and Evaluation 2, the dimension of the sheath liquid introducing opening 21A (the dimension of the sheath liquid introducing opening 21A is the same as the dimension of the opening of the sheath liquid flow path 21 and the dimension of the opening of the merging portion 16A), and the flow rate L per unit time of the sheath liquid, were varied. The respective conditions of Evaluation 1 and Evaluation 2 are as follows. (Refer to FIG. 4 and FIG. 8 for the symbols of the dimensions of the respective portions.)

| (Evaluation 1) | |
|---|---|
| sheath liquid introducing opening → | depth A: 0.6 mm, width B: 1.5 mm |
| sample liquid introducing opening → | length C: 0.5 mm, width D: 0.3 mm~1.0 mm |
| flow path length of flat portion → | length F: 3 mm, depth H: 0.09 mm |
| tapered portion → | length G: 8 mm |
| sheath liquid flow path length → | length I: 3.63 mm |
| length from upstream end of sheath liquid flow path to near side of tapered portion of merging path → | length E: 13 mm |
| flow rate of sheath liquid → | flow rate L: 4000 uL/min |
| flow rate of sample liquid → | flow rate J: 170 uL/min~1720 uL/min |

| (Evaluation 2) | |
|---|---|
| sheath liquid introducing opening → | depth A: 0.6 mm, width B: 4.0 mm |
| sample liquid introducing opening → | length C: 0.5 mm, width D: 0.3 mm~1.0 mm |
| flow path length of flat portion → | length F: 3 mm, depth H: 0.24 mm |

-continued

| (Evaluation 2) | |
|---|---|
| tapered portion → | length G: 8 mm |
| sheath liquid flow path length → | length I: 4.05 mm |
| length from upstream end of sheath liquid flow path to near side of tapered portion of merging path → | length E: 13 mm |
| flow rate of sheath liquid → | flow rate L: 1500 uL/min |
| flow rate of sample liquid → | flow rate J: 170 uL/min~1720 uL/min |

The table of FIG. 9 is the results of simulation under the conditions of Evaluation 1. In cases in which formula (1) was satisfied, i.e., in cases in which (L/S1)/(J/S2)≥0.7 was satisfied, results of evaluation were obtained in which, even if the width D was varied within the range of 0.3 mm~1.0 mm, the sample liquid flowed while contacting the lower wall portion 26B from the merging portion 16A until reaching the flat portion 16C. On the other hand, in cases in which the value of the flow rate J was large and formula (1) was not satisfied, evaluations were obtained in which, regardless of the value of the width D, the sample liquid flowed while being apart from the lower wall portion 26B from the merging portion 16A until reaching the flat portion 16C.

The table of FIG. 10 is the results of simulation under the conditions of Evaluation 2. In cases in which formula (1) was satisfied. i.e., in cases in which (L/S1)/(J/S2)≥0.7 was satisfied, results of evaluation were obtained in which, even if the width D was varied within the range of 0.3 mm~1.0 mm, the sample liquid flowed while contacting the lower wall portion 26B from the merging portion 16A until reaching the flat portion 16C. Further, in the case in which (L/S1)/(J/S2)=0.6481 that is a case in which formula (1) is not satisfied, when the width D was 0.7 mm and 1.0 mm, evaluations were obtained in which the sample liquid flowed while contacting the lower wall portion 26B from the merging portion 16A until reaching the flat portion 16C, whereas when the width was 0.3 mm and 0.5 mm, evaluations were obtained in which the sample liquid flowed while being apart from the lower wall portion 26B from the merging portion 16A until reaching the flat portion 16C. On the other hand, in cases in which the value of the flow rate J was large and formula (1) was not satisfied, in cases in which (L/S1)/(J/S2)≤0.6, evaluations were obtained in which, regardless of the value of the width D, the sample liquid flowed while being apart from the lower wall portion 26B from the merging portion 16A until reaching the flat portion 16C.

From the results of Evaluation 1 and Evaluation 2, it was confirmed that, by supplying the liquids by using the flow cell 10 of the first embodiment at the flow rate L per unit time of the sheath liquid 4 and at the flow rate J per unit time of the sample liquid 2 such that formula (1) was satisfied, the sample liquid 2 could be fed from the merging portion 16A to the flat portion 16C while mixing of the sample liquid 2 together with the sheath liquid 4 was suppressed.

Further, whether or not the sample liquid 2 flowed while contacting the lower wall portion 26B was evaluated by simulations by using the flow cell 10-2 of the second embodiment, under conditions similar to the flow cell 10 of the first embodiment. As a result, results that were similar to those of Evaluation 1 (FIG. 9) and Evaluation 2 (FIG. 10) of the flow cell 10 of the first embodiment were obtained. Due thereto, it was confirmed that, by supplying the liquids by using the flow cell 10-2 of the second embodiment at the flow rate L per unit time of the sheath liquid 4 and at the flow rate J per unit time of the sample liquid 2 such that formula (1) was satisfied, the sample liquid 2 could be fed from the merging portion 16A to the flat portion 16C while mixing of the sample liquid 2 together with the sheath liquid 4 was suppressed.

What is claimed is:

1. A measuring device comprising:

a flow cell having:

a merging path in which a sample liquid and a sheath liquid flow in a flowing direction coaxial to the merging path, at least one sheath liquid flow path that introduces the sheath liquid into the merging path in the flowing direction, the sheath liquid flow path being coaxially aligned with the flowing direction, and a sample flow path introducing the sample liquid into the merging path at an angle orthogonal to the flowing direction;

imaging means for imaging the sample liquid flowing through the merging path;

a sheath liquid supplying section that supplies the sheath liquid to the sheath liquid flow path;

a sample liquid supplying section that supplies the sample liquid to the sample flow path; and a control section controlling the sample liquid supplying section and the sheath liquid supplying section such that, given that an opening surface area of a sheath liquid introducing opening of the sheath liquid flow path onto the merging path is S1, an opening surface area of a sample liquid introducing opening of the sample flow path onto the merging path is S2, a flow rate per unit time of the sheath liquid supplied to the sheath liquid flow path is L, and a flow rate per unit time of the sample liquid supplied to the sample flow path is J, the following relationship is satisfied:

$$(L/S1)/(J/S2) \geqq 0.7,$$

wherein the sample flow path is formed from the sample liquid introducing opening to a sample liquid flow-in opening, the sample liquid flow-in opening being an opening of the flow cell, and the sheath liquid flowing along the merging path pushes the sample liquid against a wall surface adjacent to the sample liquid introducing opening such that the sample liquid remains in contact with the wall surface while entering the merging path from the sample liquid introducing opening and flowing along the merging path.

2. The measuring device of claim 1, wherein at least one of the sheath liquid introducing opening or the sample liquid introducing opening is rectangular.

3. The measuring device of claim 1, wherein a width of the sample liquid introducing opening, orthogonal to the flowing direction in the merging path, is within a range of 0.3 mm to 1.0 mm.

4. The measuring device of claim 1, wherein a depth of the sheath liquid introducing opening, along a direction of introducing the sample liquid, is within a range of 0.4 mm to 0.8 mm.

5. The measuring device of claim 1, wherein the merging path has:

a merging portion at which the sample flow path and the sheath liquid flow path merge;

a flat portion disposed further toward a downstream side than the merging portion, and formed so as to be flush with one wall surface among facing wall surfaces of the merging portion, and at which a distance between the facing wall surfaces is shorter than at the merging portion; and a tapered portion connecting the merging portion and the flat portion, and at which the distance between the facing wall surfaces gradually decreases toward a downstream side.

6. The measuring device of claim 5, wherein the sample liquid introducing opening is formed in the one wall surface.

7. The measuring device of claim 6, wherein the one wall surface and one wall surface of the sheath liquid flow path are flush.

8. The measuring device of claim 1, wherein the imaging means is disposed at a side of the merging path, at which side the sample liquid is introduced in, with the flow cell therebetween.

9. A method of feeding a sample liquid to a flow cell having:

a merging path in which a sample liquid and a sheath liquid flow in a flowing direction coaxial to the merging path, at least one sheath liquid flow path that introduces the sheath liquid into the merging path in the flowing direction, the sheath liquid flow path being coaxially aligned with the flowing direction, and a sample flow path introducing the sample liquid into the merging path at an angle orthogonal to the flowing direction, wherein, given that an opening surface area of a sheath liquid introducing opening of the sheath liquid flow path onto the merging path is S1, an opening surface area of a sample liquid introducing opening of the sample flow path onto the merging path is S2, a flow rate per unit time of the sheath liquid supplied to the sheath liquid flow path is L, and a flow rate per unit time of the sample liquid supplied to the sample flow path is J, the following relationship is satisfied:

$$(L/S1)/(J/S2) \geqq 0.7,$$

wherein the sample flow path is formed from the sample liquid introducing opening to a sample liquid flow-in opening, the sample liquid flow-in opening being an opening of the flow cell, and wherein the sheath liquid flowing along the merging path pushes the sample liquid against a wall surface adjacent to the sample liquid introducing opening such that the sample liquid remains in contact with the wall surface while entering the merging path from the sample liquid introducing opening and flowing along the merging path.

* * * * *